(12) United States Patent
Gupta et al.

(10) Patent No.: US 8,600,993 B1
(45) Date of Patent: Dec. 3, 2013

(54) DETERMINING RESOURCE ATTRIBUTES FROM SITE ADDRESS ATTRIBUTES

(75) Inventors: Surabhi Gupta, Palo Alto, CA (US); Trystan Upstill, Mountain View, CA (US)

(73) Assignee: Google Inc., Mountain View, CA (US)

( * ) Notice: Subject to any disclaimer, the term of this patent is extended or adjusted under 35 U.S.C. 154(b) by 299 days.

(21) Appl. No.: 12/548,128

(22) Filed: Aug. 26, 2009

(51) Int. Cl.
*G06F 7/10* (2006.01)
*G06F 17/30* (2006.01)

(52) U.S. Cl.
USPC .......................................... 707/737; 707/709

(58) Field of Classification Search
USPC ......... 707/705, 706, 711, 722, 723, 726, 729, 707/730, 731, 748, 749, 750, 751, 752, 758, 707/802, 803, 709, 737
See application file for complete search history.

(56) References Cited

U.S. PATENT DOCUMENTS

| | | | |
|---|---|---|---|
| 6,611,835 B1 * | 8/2003 | Huang et al. ........................... 1/1 |
| 7,698,331 B2 * | 4/2010 | Carson et al. ................. 707/728 |
| 7,739,270 B2 * | 6/2010 | Brill et al. ...................... 707/722 |
| 7,917,488 B2 * | 3/2011 | Niu et al. ....................... 707/706 |
| 7,949,672 B2 * | 5/2011 | Zhang et al. ................... 707/767 |
| 2003/0046311 A1 * | 3/2003 | Baidya et al. ................. 707/200 |
| 2006/0044319 A1 * | 3/2006 | Molesky et al. .............. 345/581 |
| 2009/0327304 A1 * | 12/2009 | Agarwal et al. ................. 707/10 |

OTHER PUBLICATIONS

U.S. Appl. No. 11/781,847, filed Jul. 23, 2007, Li, et al.
U.S. Appl. No. 11/781,843, filed Jul. 23, 2007, Diligenti et al.
U.S. Appl. No. 11/781,860, filed Jul. 23, 2007, Diligenti et al.
U.S. Appl. No. 11/781,858, filed Jul. 23, 2007, Diligenti et al.

* cited by examiner

*Primary Examiner* — Jean M Corrielus
*Assistant Examiner* — Evan Aspinwall
(74) *Attorney, Agent, or Firm* — Fish & Richardson P.C.

(57) ABSTRACT

Methods, systems, and apparatus, including computer programs encoded on a computer storage medium, for determining resource attributes from site address attributes. In one aspect, a method includes resource attributes of resources addressed by the resource locator and address attributes of the resource locators, determining a set of similar resource locators from the address attributes of the resource locators, comparing the address attributes of the resource locators in the set of similar resource locators to the resource attributes of the resources addressed by the resource locators in the set of similar resource locators, and determining, based on the comparison, likelihoods that the address attribute of the resource locators in the set of similar resource locators indicates resource attributes of the resources.

27 Claims, 5 Drawing Sheets

DETERMINING RESOURCE ATTRIBUTES FROM SITE ADDRESS ATTRIBUTES

BACKGROUND

This specification relates to search systems, and more particularly to processing the resource addresses of sites to facilitate information retrieval.

The Internet provides access to a wide variety of resources, examples of which include video or audio files, web pages for particular subjects, book articles, or news articles. A search engine can identify resources in response to a user query that includes one or more search terms or phrases. The search engine ranks the resources based on their relevance to the query and importance and provides search results that link to the identified resources. One example search engine is the Google™ search engine provided by Google Inc. of Mountain View, Calif., U.S.A.

A web site is one or more resources associated with a domain name, and one or more servers host each web site. Web sites are maintained publishers that manage and/or own the web sites. Often web sites include substantively duplicative or similar resources targeted to different groups of users. Examples of substantively duplicative or similar resources are resources in different languages, e.g., resources in a website that includes corresponding sets of web pages in English, French, German, Japanese, etc.; resources for different countries but in the same language, e.g., English-language pages for users in the United States, Australia, Germany, France, etc.; and user-agent specific pages for different types of user agents.

Often, however, the publisher does not explicitly identify the targeting of the resource, and the targeting cannot be reliably inferred from the resource locator alone. For example, a web site may have sets of resources with similar resource locators, such as:

au.example.com/ . . . /index.html
cn.example.com/ . . . /index.html
de.example.com/ . . . /index.html or www.example.com/a/ . . . /index.html
www.example.com/b/ . . . /index.html
www.example.com/c/ . . . /index.html The resource locators in the first set of resource locators are similar in that they are identical except for the country code host names for the country codes of Australia, China and Germany. The resource locators in the second set of resource locators are similar except for the top level path directories a, b and c. For the first set of resource locators, the publisher may provide resources in the same language (e.g., English) and targeted to different countries. Alternatively, the publisher may provide language specific resources targeted to specific languages (e.g., English, Chinese, and German).

With respect to the second set of resources, the publisher may have created its own resource locator structure, the targeting purpose of which is not readily apparent. The top level path directories a, b and c may indicate a language targeting, a country targeting, a user agent targeting, or some other targeting or partitioning of resources based on one or more resource attributes.

Because the resources of the web site may be substantively duplicative or similar, the search results can include search results for the same domain and referencing similar or duplicative resources. A typical user may consider such search results to be redundant. The presence of such search results can obscure other, unique resources identified within the domain, and thus degrade the user experience.

SUMMARY

This specification describes technologies relating to determining resource attributes for resources hosted at a web site from address attributes of the resource locators used at the web site. The address attributes are compared user attributes associated with a search query, and search results referencing the resources are promoted and demoted based on comparison.

In general, one innovative aspect of the subject matter described in this specification can be embodied in methods that include the actions of selecting at a data processing apparatus resource locators having a resource name including a same domain name; determining at the data processing apparatus, for each resource locator: resource attributes of a resource addressed by the resource locator and address attributes of the resource locator, each address attribute being a corresponding portion of the resource locators that varies according to an identified pattern; determining at the data process apparatus a set of similar resource locators from the address attributes of the resource locators, the set of similar resource locators being a set of resource locators having a same address attribute in addition to the same domain name; comparing at the data processing apparatus the address attributes of the resource locators in the set of similar resource locators to the resource attributes of the resources addressed by the resource locators in the set of similar resource locators; for each address attribute, determining, based on the comparison, a likelihood that the address attribute of the resource locators in the set of similar resource locators indicates a resource attribute of the resources; and associating, in a resource index data store, the likelihoods of the address attributes with the resource locators in the set of similar resource locators. Other embodiments of this aspect include corresponding systems, apparatus, and computer programs, configured to perform the actions of the methods, encoded on computer storage devices.

Another innovative aspect of the subject matter described in this specification can be embodied in methods that include the actions of selecting at a data processing apparatus resource locators having a resource name ending in a same domain name; determining in the data processing apparatus, for each resource locator: resource attributes of a resource addressed by the resource locator and address attributes of the resource locator, each address attribute being a corresponding portion of the resource locators that varies according to an identified pattern; determining at the data process apparatus a set of similar resource locators from the address attributes of the resource locators, each of the sets of similar resource locators being a set of resource locators having one of the address attributes in addition to the same domain name; determining at the data processing apparatus a likelihood that the address attribute of the resource locators in the set of similar resource locators indicates a resource attribute of the resources; and associating, in a resource index data store, a likelihood of the address attribute with the resource locators in the set of similar resource locators. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The search engine can use the resource address structure of a web site to determine resource attributes of a resource addressed by a resource locator. Attributes of resource address structures can be resolved to corresponding attributes of resources addressed by the resource locators. A search result for a resource having resource attributes that are most aligned with user attributes can be promoted in a presentation order, and search results for resources having similar attributes can be demoted. The demotion can, in some situations, reduce the presentation of search results referencing redundant resources. Resources can be grouped by the corresponding address attributes of the resource locators so that resources are grouped by similar resource attributes. For example, web pages that vary according to language targeting can be grouped in a first group, and web pages that vary according to user agent targeting can be grouped in a second group. The groupings can be used to provide additional resources to users in response to search operations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Example Environment

Figure 1:
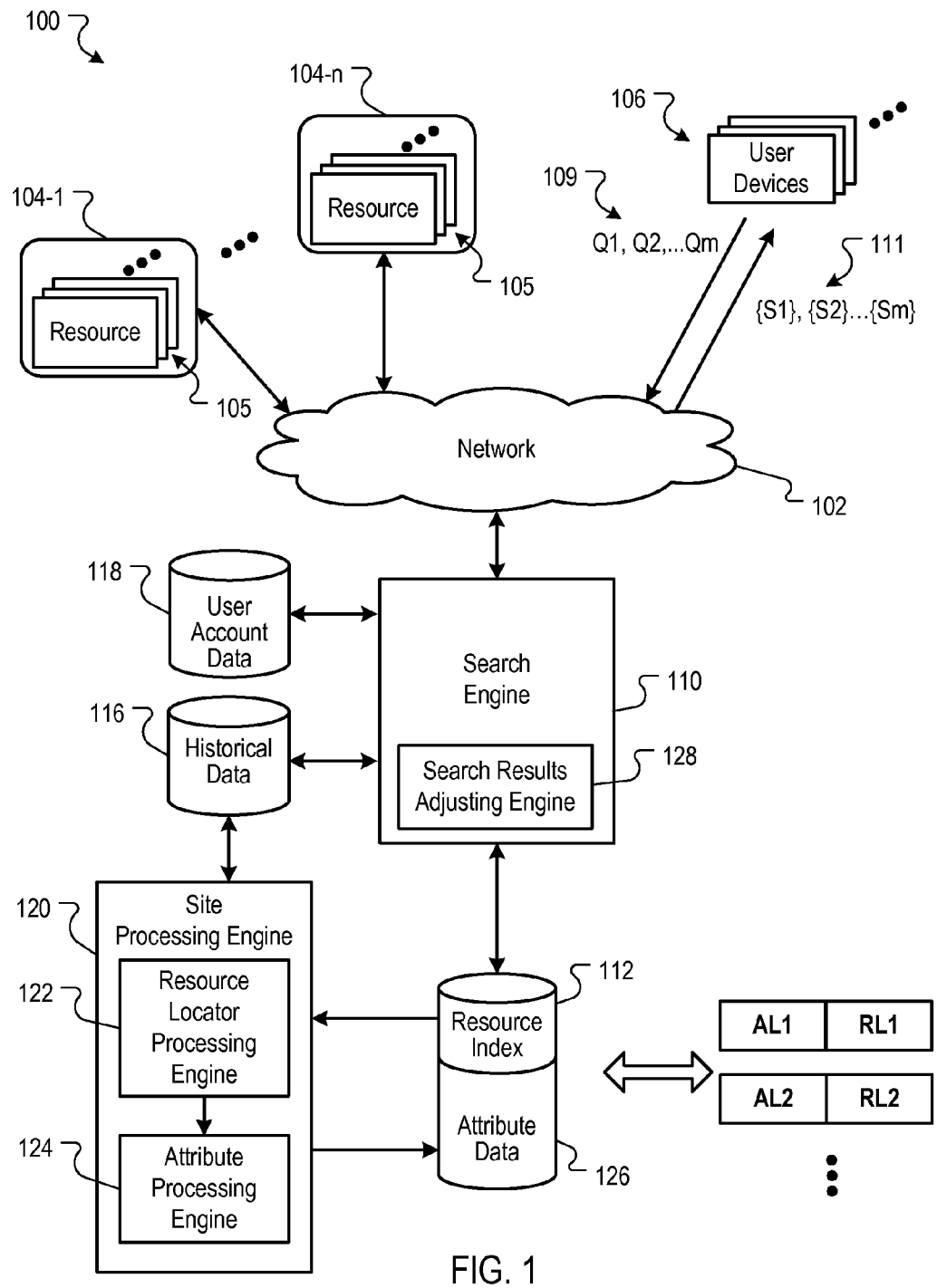
FIG. 1 is a block diagram of an example environment in which a site processing engine can be used.

FIG. 1 is a block diagram of an example environment 100 in which a site processing engine 120 can be used. A computer network 102, e.g., a local area network (LAN), wide area network (WAN), the Internet, or a combination thereof, connects web sites 104, user devices 106, and a search engine 110. The environment 100 may include many thousands web sites 104 and user devices 106.

A user device 106 is an electronic device that is under control of a user and is capable of requesting and receiving resources over the network 102. Example client devices 106 include personal computers, mobile communication devices, and other devices that can send and receive data over the network 102. A user device 106 typically includes a user application, e.g., a web browser or other communication software, to facilitate the sending and receiving of data over the network 102.

A web site 104 is one or more resources 105 associated with a domain name, and one or more servers host each web site. Respective publishers and/or advertisers, i.e., entities that manage and/or own the web sites 104, maintain the web sites 104.

A resource 105 is any data that can be provided by the web site 104 over the network 102 and that is associated with a resource address. Resources include HTML pages, word processing documents, portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts).

Each resource is addressed by a resource locator, such as a universal resource locator (URL). A resource locator is a string of characters that identifies a resource 105 on a web site 104 and provides a means for locating the resource 105. The resource locator includes a resource name, such as a host name and a path of the resource. In the context of a URL, for example, the resource name follows the protocol name, and includes the host name, the path name, and the file name of the resource. The host name identifies the computer host that manages the resource, and typically ends in a domain name. For example, the domain name "example.com" may have host names corresponding to languages or countries, such as en.example.com, de.example.com, fr.example.com, and so on. The path name identifies a directory where the resource is located. The file name is the name of the resource.

To facilitate searching of these resources, the search engine 110 crawls the web sites 104 and indexes the resources 105 that the web sites 104 host. The indexed and, optionally, cached copies of the resources are stored in a resource index 112.

The user devices 106 submit search queries 109 (Q1, Q2 ... Qm) to the search engine 110. In response, the search engine 110 uses the resource index 112 to identify resources that are relevant to the queries. The search engine 110 identifies the resources in the form of search results 111 and returns the search results 111 to the user devices 106 in search results pages ({S1}, {S2} ... {Sm}).

A search result 111 is data generated by the search engine 110 that identifies a resource that satisfies a particular search query, and includes a resource locator for the resource. An example search result 111 can include a web page title, a snippet of text extracted from the web page, and the URL of the web page. The search results are ranked based on scores related to the resources identified by the search results, such as information retrieval ("IR") scores, and optionally a separate authority ranking that measures the importance of each resource relative to other resources. In some implementations, the IR scores are computed from dot products of feature vectors corresponding to a query and a content item, and the ranking of the search results is based on relevance scores that are a combination of the IR scores and page rank scores. The search results 109 are ordered according to these relevance scores and provided to the user device according to the order.

The user devices 106 receive the search results pages and render the pages for presentation to users. In response to the user selecting a search result at a user device 106, the user device 106 requests the resource identified by the resource locator included in the selected search result. The web site 104 hosting the resource receives the request for the resource from the user device 106 and provides the resource to the requesting user device 106.

The queries submitted from user devices 106, and the actions taken in response to the search results being provided to the user devices 106 are stored in historical data 116. The historical data can include query logs, which store queries submitted by users, and click logs, which store data determining the actions taken by the users using the user devices. The click logs and query logs can be used to map queries submitted during search sessions to resources that were identified in response to the queries and that were selected by the users of the user devices 106.

In some implementations, the search engine 110 maintains user accounts. Each user account is keyed to a user identifier that is uniquely associated with a user or user device, and the user identifier is associated with search sessions for its account. A user can grant permission to the search engine 110 to track the user's history so that historical data and other user data are tracked and associated with the user identifier. At the user's option, the search engine 110 tracks only data approved by the user, such as only search queries and search result selections. The user can clear all historical data associated with the user account data 118 at any time, and can opt-out of such tracking at any time. The user account data can also store demographic data about the user, the user's country and language, bookmarks, subscribed feeds, and other information about the user.

As described above, web sites often include substantively duplicative or similar resources targeted to different groups of users. Examples of substantively duplicative or similar resources are substantively similar resources in different languages, resources targeted to different countries but in the same language, and user-agent specific pages for different types of user agents.

Often the publisher does not explicitly identify the targeting of the resource; however, the publisher's web site may have different resource locator structures, each having a unique address attribute corresponding to a particular targeting of resources. As used in this description, an "address attribute" of a resource locator is any portion of the resource locator that varies according to an identified pattern. The identified pattern of the portion of the resource locator that varies can be the same number of characters, or can vary in the number of characters. For example, the set of resource locators au.example.com/ . . . /index.html
    cn.example.com/ . . . /index.html
    de.example.com/ . . . /index.html have a two-letter language and country code address attribute that precedes the domain name "example.com." Likewise, the set of resource locators www.example.com/ar/ . . . /index.html
    www.example.com/bnak/ . . . /index.html
    www.example.com/chr/ . . . /index.html have a top-level directory address attribute that follows the domain name "example.com." The top-level directory address attribute can vary in length; as shown, the top-level directory names vary in length from two to four characters.

The targeting, however, often cannot be reliably inferred from the resource locator alone, as the resource locator structure may include an address attribute that is ambiguous with respect to targeting (e.g., using both language codes and country codes in a particular portion of a resource locator) or may include address attributes that do not readily suggest a targeting scheme (e.g., using a non-standard set of alphanumeric codes developed by the publisher).

If the web site 104 implements such address attributes in the resource locator structure, then the resources referenced by resource locators with a same address attribute will likely vary according to a common resource attribute. As used herein, a resource attribute is characteristic of a resource, such as a language of a resource, a country targeting of the resource, or a specified user agent for the resource. For example, if the resources addressed by the resource locators au.example.com/ . . . /index.html, cn.example.com/ . . . /index.html, and de.example.com/ . . . /index.html are in the languages of English, Chinese and German, respectively, then a language attribute of the resources is indicated by the language/country code address attribute of the resource locators; conversely, if each of the resources are in English but each resource is targeted to Australia, China and Germany, respectively, then a country targeting attribute of the resources is indicated by the language/country code address attribute.

If the relationship between the resource attributes of the resources and the address attributes in the resource locators is known, the search engine 110 can use this information in various search-related operations. One example operation is reordering search results from a first order to a second order. For example, if two search results in the top N search results in the first order include two resource locators with the same address attribute, it is likely that the resources that the two resource locators reference and redundant, or that one of the resources may be better aligned with attributes of the user than the other resource.

Attributes of the user can be implicitly defined or explicitly defined. Implicitly defined attributes are attributes that are derived from user actions and user traffic data. For example, one or more language attributes for a user can be derived from determining the languages of resources the user accesses or requests. To illustrate, assume a particular user often reads resources written in Spanish and English, and does not read resources written in other languages. Accordingly, the user can be determined to have the language attributes of Spanish and English. Likewise, if a user accesses the Internet from an IP address that is resolved to a location in Mexico City, Mexico, then the user can be associated with a country attribute of Mexico.

Explicitly defined attributes are attributes that are defined by the user. For example, the user can specify what language a browser interface is to be presented, and this preference can be used as a language attribute. Additionally, user profile data, such as profile data associated with a user account stored in the user account data 118, can be used to determine user attributes, such as age, gender, etc.

The search result including a resource locator that indicates that the corresponding resource is more aligned with the user attributes can be promoted. The other search result including a resource locator that indicates that the corresponding resource is less aligned with the user attributes can be optionally demoted.

Process for determining which resource attributes are represented by address attributes of the resource locators for website are described below, as are processes for promoting and demoting corresponding search results that include those resource locators.

§2.0 Site Processing

The search engine 110 includes, or is in data communication with, a site processing engine 120 that processes the resource locators of a site and the resources addressed by the resource locators to determine the resource attributes of a resource that the address attributes of a resource locator for the site represent. In some implementations, the site processing engine 120 includes a resource locator processing engine 122 and attribute processing engine 124. The partitioning of the functionality of the site processing engine 120 between the resource locator processing engine 122 and the attribute processing engine 124 is illustrative only. Additional partitioning of the functions described below can be implemented, or, alternatively, the site processing engine 120 can be a single software engine that performs all the functions described below.

§2.1 Resource Locator Processing

Figure 2:
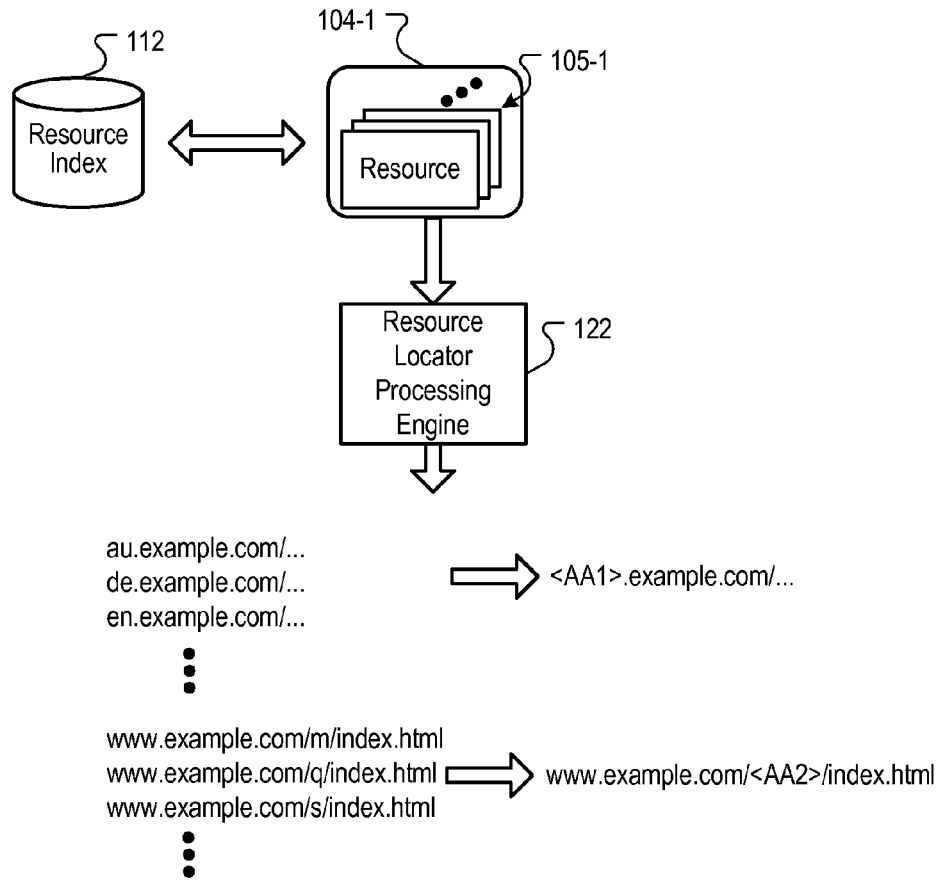
FIG. 2 is a block diagram illustrating a process flow of a resource locator processing engine.

FIG. 2 is a block diagram illustrating a process flow of the resource locator processing engine 122. The resource locator processing engine 122 selects resource locators for a particular website, e.g., resource locators having a resource name including a same domain name. The resource locator processing engine 122 identifies, for each resource locator, address attributes of the resource locator. Once the address attributes are identified, the resource locator processing engine identifies sets of similar resource locators from the address attributes. Each set of similar resource locators is a set of resource locators having a same address attribute in addition to the same domain name.

In some implementations, the resource locator processing engine 122 accesses the resource index 112 and selects all indexed resource locators for a particular domain name. The resource locators are compared to determine sets of set of similar resource locators from the address attributes of the resource locators.

One example of a set of similar resource locators is a set resource locators having the same address attribute prepending the same domain name. For example, each the resource locators
  au.example.com/ . . .
  de.example.com/ . . .
  en.example.com/ . . .
have a language code or country code address attribute prepending the domain name example.com. Thus, the set of similar resource locators can be represented by the resource locator notation "AA1.example.com/ . . . ", where AA1 represents the language or country codes.

Another example of a set of similar resource locators is a set resource locators having the same address attribute in a path following the domain name. For example, each of the resource locations:
  www.example.com/m/products/index.html
  www.example.com/qm/products/index.html
  www.example.com/qm2/products/index.html
have a directory path address attribute that immediately follows the domain name example.com. Thus, the set of similar resource locators can be represented by the resource locator notation "www.example.com/AA2/products/index.html", where AA2 represents the top-level directory names m, qm, and qm2.

Other address attributes can also be identified. For example, address attributes can include varying port numbers, varying query parameters, and varying file names.

Each of the identified address attributes in a resource locator potentially identifies one or more attributes of the resources that the resource locator references. The attribute processing engine 124 receives the address attribute and determines if the address attributes indicate corresponding resource attributes in the resources, as described below.

§2.2 Attribute Processing

Figure 3:
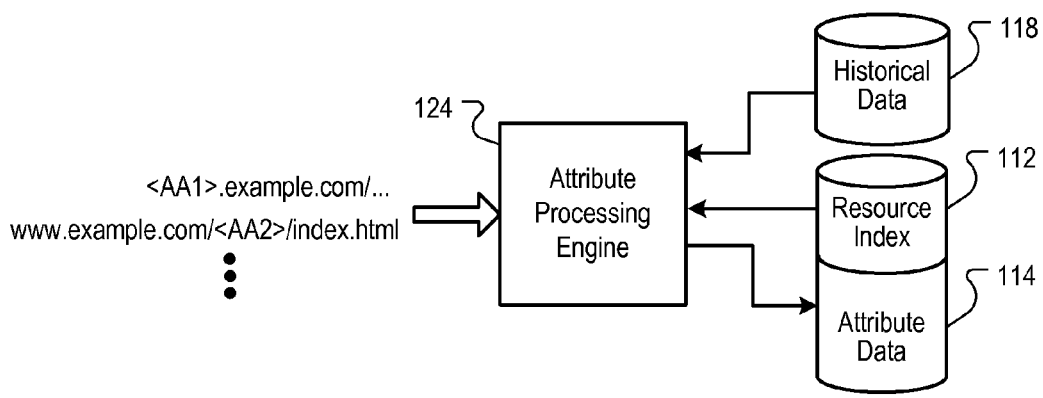
FIG. 3 is a block diagram illustrating a process flow of an attribute processing engine.

FIG. 3 is a block diagram illustrating a process flow of an attribute processing engine 124. The attribute processing engine 124 receives the sets of the similar resource locators and, for each resource locator, selects the referenced resource and determines the resource attributes of a resource addressed by the resource locator. Using these address attributes and the resource attributes, the attribute processing engine 124 determines the likelihood that an address attribute of the resource locators in the set of similar resource locators indicates a resource attribute of the resources. These attribute likelihoods (AL) are then associated with the resource locators (RL) in the resource index 112 as attribute data 126. Accordingly, by accessing the resource index 112, the search engine 110 can determine the likelihoods that the resources referenced by the resource locator include the indicated attributes.

In some implementations, the likelihoods can correspond to probabilities that a resource locator indicates the attribute. The attribute processing engine 124 compares the address attributes of the resource locators in a set of similar resource locators to the resource attributes of the resources addressed by the resource locators in the set of similar resource locators to determine the likelihoods. For example assume that the web site 104-1 has 1,000 resource locators that include the address attribute AA1. The attribute processing engine 124 can process each resource to determine if the resource is language targeted (e.g., written in a language that a two-letter language code in the resource locator represents, or the resource is served for all requests associated with that language) or is country targeted (e.g., most traffic comes from the country that a two-letter country code represents, or the resource is served for all requests originating from that country).

The attribute processing engine 124 increments a country counter in response to determining that a resource addressed by a resource locator is country targeted, and likewise increments a language counter in response to determining that a resource addressed by a resource locator is language targeted. In some implementations, it is possible for both counters to be incremented for a particular resource. Once the attribute processing engine 124 processes all the resource locators and referenced resources for a set of similar resource locators, the attribute processing engine 124 determines the likelihood that the address attribute of the resource indicates a language based on the language counter, and determines likelihood that the address attribute of the resource indicates a country based on the country counter.

For example, if, after processing the 1,000 resource locators, the language counter and country counter values are 111 and 743, respectively, the corresponding likelihoods can be determined to be 0.111 and 0.743.

Other ways of determining the likelihoods and different likelihoods can be used, depending upon the implementation. For example, the probability of a resource locator pattern (e.g., a language or country identifier) being a language or country indicator for resource locators in a large corpus for many different domains can be determined. These a priori probabilities are then combined with the observed distribution over a web site. The combinations are then further combined into language and country confidences. Example data for several language and country indicators are shown in Table 1 below.

TABLE 1

| Resource Locator | Lang. a priori Prob. | Lang. Dist. | Lang. Conf. | Country a priori Prob. | Country Dist. | Country Conf. | Freq. |
|---|---|---|---|---|---|---|---|
| fr.example.com | 0.9 | 0.99 | 0.891 | 0.99 | 0.7 | 0.693 | 1000 |
| ca.example.com | 0.05 | 0.0 | 0.0 | 0.95 | 0.9 | 0.855 | 100 |
| de.example.com | 0.9 | 0.9 | 0.81 | 0.7 | 0.9 | 0.63 | 1000 |
| in.example.com | 0.0 | 0.0 | 0.0 | 0.8 | 0.99 | .079 | 1000 |

The first column of Table 1 lists a portion of a resource locator that includes an address attribute, i.e., a language or country code identifier. The second column of Table 1 lists the observed probability that the code indicates a language in a large corpus of resources. For example, the code "ca", in the context of a language, is included in resource locators that reference resources in the Catalan language only 5% of the time. The third column of Table 1 is the percentage of resources referenced by the resource locator at the web site with the domain name example.com and that are in the language indicated by the language code. For example, the code "ca", in the context of a language, is not included in any resource locators that reference resources in the Catalan language for the web site. The fourth column of Table 1 is the product of the language a priori probability and the observed language distribution.

The fifth, sixth and seventh columns are similar to the second, third and fourth columns, except that the data in the fifth, sixth and seventh columns correspond to country targeting. The eighth column includes the number of resources referenced by resource locators that include the corresponding string in the first column. For example, for the domain name example.com, 1,000 resource locators include the string "ca.example.com."

To determine the corresponding language and country likelihoods, the language and country confidence values are multiplied by their corresponding frequencies and summed.

For example, with respect to Table 1, the language and country likelihoods are determined as followings:

Language Likelihood=(0.891*1000+0*100+
0.81*1000+0*1000)/3100=0.548

Country Likelihood=(0.693*1000+0.855*100+
0.63*1000+0.79*1000)/3100=0.710

Other likelihoods can include likelihoods that an address attribute indicates a language targeting, a country targeting, a topic targeting, a user agent targeting, and/or other types of attributes of the referenced resources.

The example likelihoods above apply globally to the address attribute AA1. In some implementations, separate likelihoods can be determine for each type of indicator that belongs to an address attribute. For example, for the address attribute AA1, likelihoods can be determined for each of the two-letter codes au, de, fr, and so on.

As similar process can also be used for other address attributes. For example, the attribute processing engine 124 may determine that the set of similar resource locators having the address attribute AA2 may reference resources that are user agent specific. Accordingly, the attribute processing engine 124 determines a likelihood that that address attribute AA2 represents a user agent.

In some implementations, the attribute processing engine 124 can access the historical data 116 and the resource index 112 and use additional heuristics to determine whether an address attribute represents the resource attribute. These additional heuristics include publisher and/or user feedback, site linkage information, and query revisions. Example publisher and/or user feedback includes specific indications of which resource locators are related and the targeting of those resource locators (i.e., language targeting, country targeting, topic targeting, and/or user agent targeting). Example site linkage information includes internal linkage within a site indicating a hierarchical relationship. For example, host names may be indicative of countries and or languages, and each host may have a duplicate of resource locator hierarchy. Example query revisions include adding a language or country indicator to a query followed by a subsequent selection of a search result referencing a resource that is targeted to the specified language or country. Other heuristics can also be used.

§2.3 Search Processing

Figure 4A:
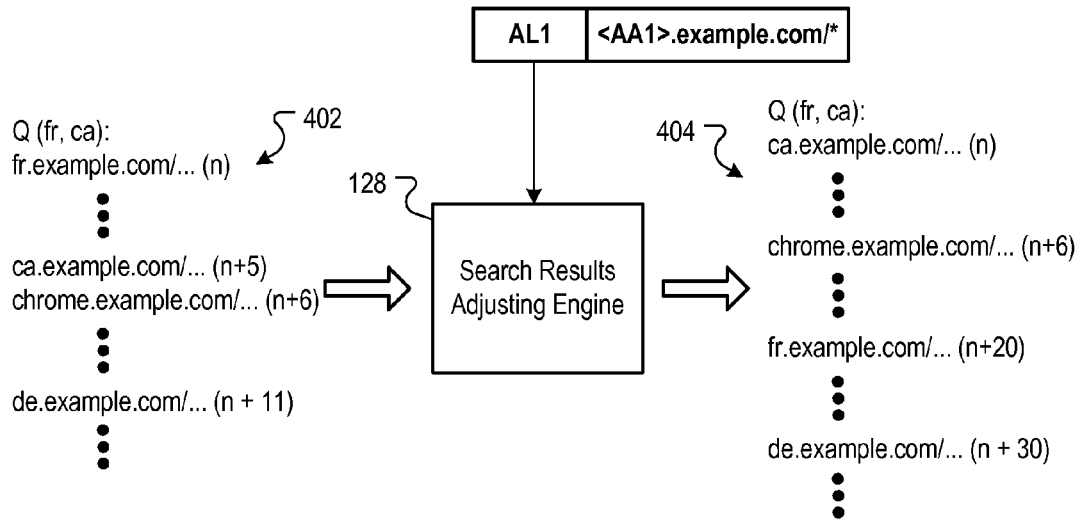
FIG. 4A is a block diagram illustrating a process flow of a search results adjusting engine.

FIG. 4A is a block diagram illustrating a process flow of a search results adjusting engine 128. The attribute likelihoods of resource locators referenced in search results responsive to a query are compared to user attributes associated with the query. Example user attributes includes agent type, language, country, and geo-location, and the user attributes can be represented by a vector of values. The user attributes can be derived from or provided by a user device 106 that submitted the query, and/or obtained from the user account data 118. The search results adjusting engine 128 adjusts the order of the search results based on this comparison, as described below.

At query time, the search results adjusting engine 128 receives search results responsive to the query and ranked according to a first order. Each search result includes a resource locator referencing a resource. For each search result including a resource locator associated with likelihoods of address attributes, the search results adjusting engine generates an alignment score from the user attributes and from the likelihoods associated with the resource locator. Each alignment score is a measure of an alignment of resource attributes of the resource to the user attributes.

The search results adjusting engine 128 compares the alignment scores for resource locators on a set-by-set basis, i.e., the alignment score of a resource locator belonging to a first set of similar resource locators is compared only to other alignment scores of resource locators belonging to the first set of similar resource locators. If a search result has an alignment score indicating that the resource attributes of the referenced resource are most aligned with the user attributes relative to other resources referenced by other resource locators in the first set of similar resource locators, and the search result is not the highest ranked search result relative to other search results, then the search results adjusting engine 128 increases the rank of the search result. In some implementations, the search result adjusting engine increases the rank of the search result so that the search result is ranked higher than all other search results that include resource locators belonging to the first set of similar resource locators.

Whether a search result having a highest alignment score can be adjusted can also be based on a number of additional conditions. For example, in some implementations, the search results adjusting engine 124 first determines whether the search result with the highest alignment score has an associated relevance score that exceeds a minimum relevance score. For example, if the search result is not within the top N ranked search results in the first order, e.g., N=20, then no adjustment is made.

Other additional conditions can include a maximum number of search results that can be promoted; the order of the search result in the first order before any promotions or demotions are made; the relevance score of the search result under consideration to be promoted compared to the relevance score of the search result it would displace; and other conditions. For example, in some implementations, only one promoted search result can be presented on a search results page; and a search result may not be promoted if the relevance score of the search result is less than a proportional amount of the relevance score of the search result it would displace (e.g., an order of magnitude less).

In some implementations, the search results adjusting engine 124 decreases a rank of other search results that include resource locators in the first set of similar resource locators and that are ranked higher in the first order than the search result with the highest alignment score.

Additionally, the search results adjusting engine 124 can optionally maintain the rank of search results including resource locators that do not belong to the first set of similar resource locators. For example, only search results having resource locators belonging to the first set of similar resource locators are adjusted relative to each other. Other search results that include resource locators that do not belong to the first set of similar search results (e.g., resource locators that include domain name and that are not included in the first set of similar resource locators, or resource locators associated with other domains) will not be affected in the rank.

An example adjustment is illustrated in FIG. 4A. As shown in FIG. 4A, a query, written in French (fr) and provided from a user device in Canada (ca), is received by the search engine 110 and the search engine 110 provides search results 402 ranked according to a first order. Several of the search results—fr.example.com, ca.example.com, and de.example.com—belong to a set of similar search results, i.e., search results with a two-letter language/country code address attribute. Using the processes described above, the attribute engine 124 determines that address attributes indicate a country targeting. Accordingly, as the query originated from a user device in Canada, the search result that includes the resource locator ca.example.com is determined to be most aligned with the user attribute specifying the query originated from Canada. Thus, the search result ca.example.com is promoted to the position occupied by the search result fr.example.com (e.g., position n).

Additionally, the search result fr.example.com is demoted. In some implementations, the demoted search result is demoted to a position that is not presented on a first page of search results, as indicated by the demoted position n+20 in the reordered set of search results 404. Subsequent search results that are associated with other countries, such as the search result de.example.com, can also be demoted.

Another search result that includes a resource locator associated with the same web site—chrome.example.com—is not adjusted in the rank, as that resource locator does not belong to the set of similar resource locators.

Figure 4B:
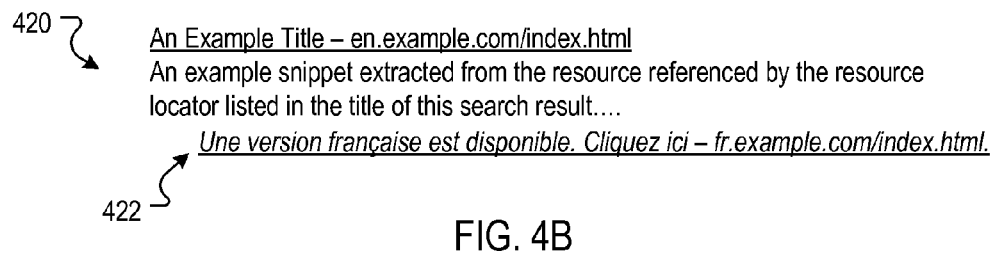
FIG. 4B shows an example grouping of user-aligned search results.

In some implementations, the search results adjusting engine 124 can promote two or more search results if the user has multiple user attributes and several search results reference resources that are determined to align with one or more of the user attributes. For example, assume an address attribute in a resource address is determined to indicate both country and language with high degrees of confidence. A user from Canada issues a query in French, and two search results that are identified include the resource locators:
 www.example.com/ca/html.index, and
 www.example.com/fr.html.index Although both resource locators may reference resources that include substantively similar information, both of the search results that include the resource locators can be promoted. In a variation of this implementation, the originally lowest ranked search result of the two search results can be grouped subordinate to the higher ranked search result. For example, FIG. 4B shows an example grouping of user-aligned search results. A search result 420 that references a resource by the resource locator en.example.com/index.html is provided in a search results page. However, the user attributes for the user that issued a query indicate that the user also has a strong preference for the French language. Accordingly, a link 422 to another page referenced by the resource locator fr.example.com/index.html is also provided. Although the link 432 is in French, in other implementations, the link can be in the same language as the search result 430.

Figure 4C:
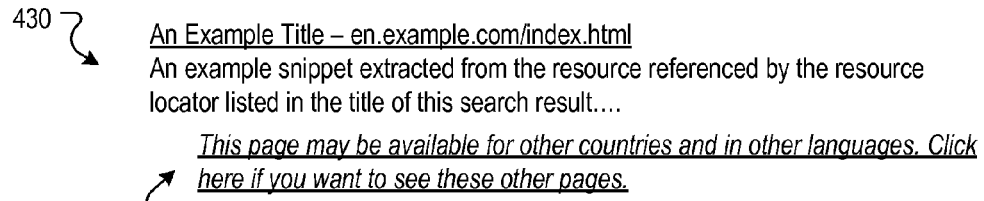
FIG. 4C shows an example search result that includes a link to resources with the same address attribute.

In some implementations, a highest ranked search result that includes a link to a resource with an address attribute can include a link to a list of other resources that are referenced by resource locators with the same address attribute. FIG. 4C shows an example search result 430 that includes a link 432 to resources with the same address attribute. The search engine 110 identifies the set of similar resource locators to which the resource locator en.example.com/index.html belongs, and includes with the first search result 430 the link 432 that links to a list of the other resource locators in the identified set of similar resource locators. In response to a selection of the link 432, the search engine 110 provides a user with a list of all resource locators that link to resources with the same address attribute.

In some implementations, multiple attribute likelihoods are compared to the user attributes associated with the query. For example, the user attributes of the query can be represented as vector with a value of 1 for the French language and a value of 1 for the country of Canada. The respective likelihoods that the two-letter code represents a language or a country can be combined with the vector values of the user attributes to generate the alignment score. For example, if the language and country likelihoods are 0.548 and 0.710 (as provided from Table 1 above), the respective language alignment score is 0.548, and the country alignment score is 0.710. Thus the resource that is most likely country targeted to Canada (i.e., the resource referenced by the resource locator that includes ca.example.com) is promoted if it is ranked lower than the resource referenced by the resource locator that includes fr.example.com.

In another implementation, the respective language and country confidences for each two-letter code can be combined with the vector values of the user attributes to generate the alignment scores. For example, the code fr has a language confidence value of 0.891, and a country confidence value of 0.693, and the code ca has a language confidence value of 0 and a country confidence value of 0.855. Assume the user has a French language attribute of 1, a French country attribute of 0, a Catalan language attribute of 0, and a Canada country attribute of 1. Accordingly, the alignment score for fr.example.com is a language alignment score of 0.891, and the alignment score for ca.example.com is a language alignment score of 0.855. Thus, the resource that is most likely language targeted to French (i.e., the resource referenced by the resource locator that includes fr.example.com) is promoted if it is ranked lower than the resource referenced by the resource locator that includes ca.example.com

§3.0 Example Processes

Figure 5:
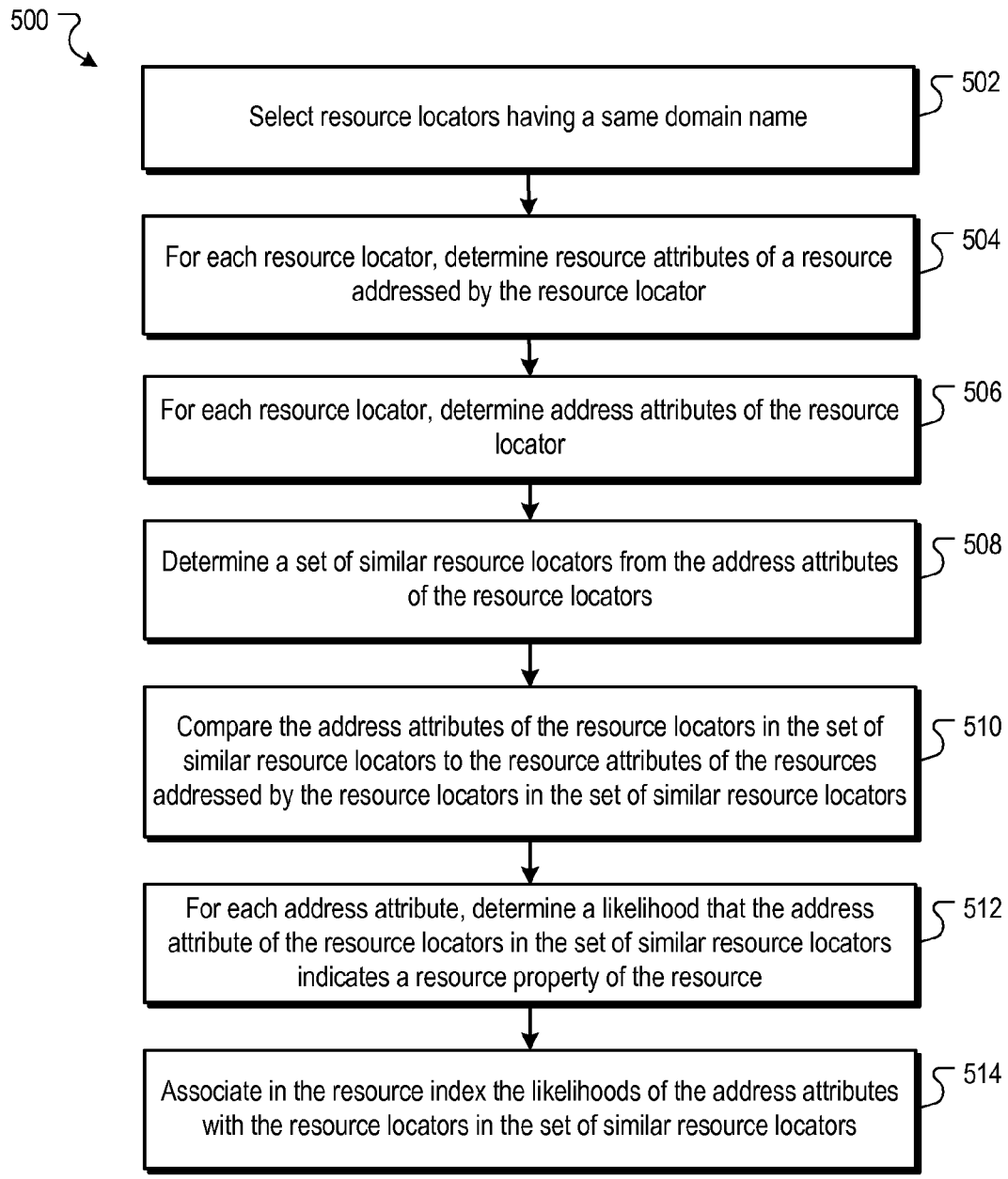
FIG. 5 is a flow diagram of an example process for determining likelihoods of attributes of resources in a web site from the addresses of the resources.

FIG. 5 is a flow diagram of an example process 500 for determining likelihoods of attributes of resources in a web site from the addresses of the resources. The site processing engine 120 of FIG. 1 can be used to perform the process 500.

The site processing engine 120 selects resource locators having a same domain name (502). For example, the resource locator processing engine 122 can select all resource locators associated with a particular website.

For each resource locator, the site processing engine 120 determines resource attributes for the resource addressed by the resource locator (504). For example, the attribute processing engine 124 can process resources referenced by the resource locators to determine the language of the resources, targeting the resources, specified user agents for the resources, and other attributes.

For each resource locator, the site processing engine 120 determines address attributes of the resource locator (506). For example, the resource locator processing engine 122 can compare the resource locators to identify portions of the resource locators that consistently vary according to an identified pattern.

The site processing engine 120 determines a set of similar resource locators from the address attributes of the resource locators (508). For example, the resource locator processing engine 122 groups resource locators having same portions that vary in the consistent manner.

The site processing engine compares the address attributes in the resource locators in a set of similar resource locators to the resource attributes of the resources address by those resource locators (510). For example, for an address attribute that potentially identifies a language or country, the attribute processing engine 124 can determine whether the corresponding resource of a resource locator is written in a language corresponding to the language or country indicator, or is targeted to a country that corresponds to the language or country indicator.

For each of the address attributes, the site processing engine 120 determines the likelihood that the address attributes of the resource locator in the set of similar resource locators indicates a resource property of the resource (512). For example, the attribute processing engine 124 can use counters corresponding to particular resource attributes, e.g., language counters, country counters, and user agent counters, and determine the likelihood that a particular address attribute represents a corresponding resource attribute based on the values of the counters.

The site processing engine 120 associates in the resource index the likelihoods of the address attributes with the resource locators in the set of similar resource locators (514). For example, the attribute processing engine 124 can store attribute data 126 and the resource index 112. The attribute data 126 can find attribute likelihoods (ALn) for each corresponding resource locator (RLn).

Figure 6:
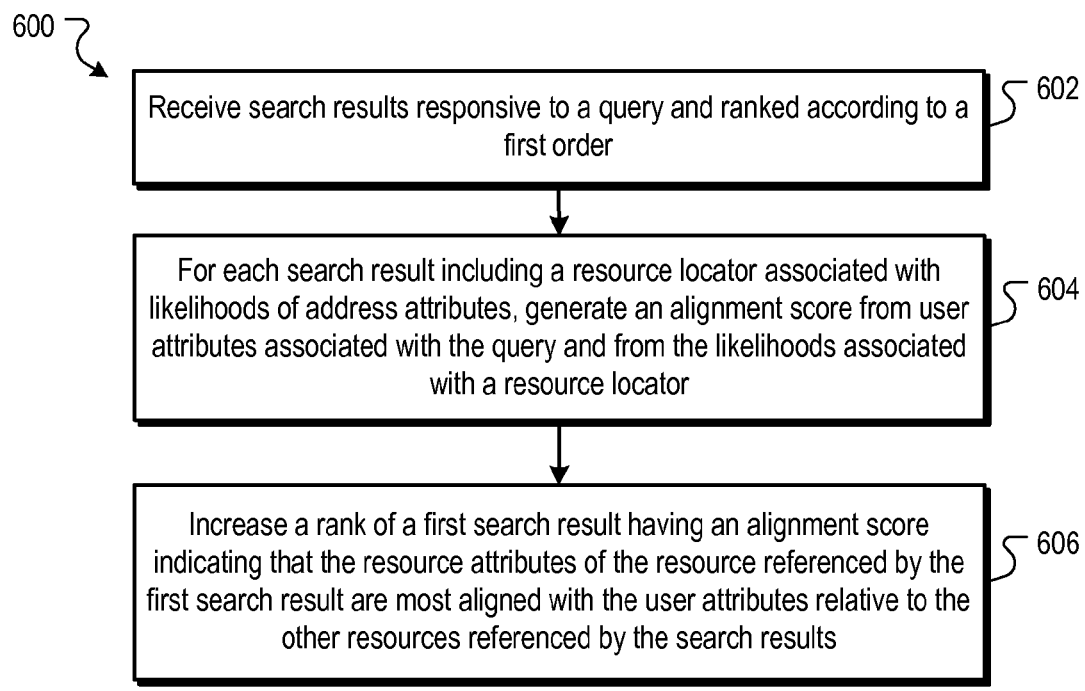
FIG. 6 is a flow diagram of an example process for adjusting an order of search results based on attribute likelihoods associated with the addresses included in the search results.

FIG. 6 is a flow diagram of an example process 600 for adjusting an order of search results. The search results adjusting engine 128 can be used to perform the process 600.

The search results adjusting engine 128 receives search results responsive to a query and ranked according to a first order (602). For example, the search results adjusting engine 128 can receive search results from the search engine 110. Each search result includes a resource locator referencing a corresponding resource.

For each search result including a resource locator associated with a likelihood of address attributes, the search results adjusting engine generates alignment score from user attributes associated with the query and from the likelihoods associated with the resource locator (604). For example, the search results adjusting engine 128 can generate alignment score from dot products of the first vector that includes scores representative of user attributes, and the second vector that includes the attribute likelihoods associated with the resource locator.

The search results adjusting engine 128 increases the rank of a first search result having an alignment score indicating that the resource attributes of the resource referenced by the first search result are most aligned with the user attributes relative to other resources referenced by the search results. For example, if a search result has an alignment score indicating that the resource attributes of the referenced resource are most aligned with the user attributes relative to other resources referenced by other resource locators in the first set of similar resource locators, and the search result is not the highest ranked search result relative to other search results that include resource locators in the set of similar resource locators, then the search results adjusting engine 128 increases the rank of the search result.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and an apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus that includes one or more processors, the method comprising:
    selecting at a data processing apparatus resource locators having a resource name, each of the resource locators including a same domain name;
    determining at the data processing apparatus, for each resource locator:
        resource attributes of a resource addressed by the resource locator, wherein the resource attributes are attributes of content of the resource, and each resource attribute corresponds to a plurality of characteristic values for the resource attribute; and
        address attributes of the resource locator, each address attribute being a corresponding portion of the resource locators that varies according to an identified pattern and corresponding to a plurality of address attribute values;

determining at the data process apparatus a set of similar resource locators from the address attributes of the resource locators, the set of similar resource locators being a set of resource locators having a same address attribute in addition to the same domain name, and wherein the resource locators in the set of resource locators vary according to the address attribute values to which the address attribute corresponds;

comparing at the data processing apparatus the address attribute of the resource locators in the set of similar resource locators to the resource attributes of the resources addressed by the resource locators in the set of similar resource locators;

determining, based on the comparison, a likelihood that the address attribute of the resource locators in the set of similar resource locators indicates a resource attribute of the resources, the indication being based on resources referenced by the resource locators with the address attribute varying by the address attribute values according to the plurality of characteristic values corresponding to the resource attribute; and associating, in a resource index data store, the likelihood of the address attribute with the resource locators in the set of similar resource locators.

2. The method of claim 1, wherein determining a set of similar resource locators from the address attributes of the resource locators comprises determining resource locators having the same address attribute prepending the same domain name.

3. The method of claim 1, further comprising:
receiving search results responsive to a query, the search results ranked according to a first order, and each search result including a resource locator referencing a resource;
for each search result including a resource locator associated with likelihoods of the address attributes, generating at the data processing apparatus an alignment score from user attributes and from the likelihoods associated with the resource locator, each alignment score being a measure of an alignment of resource attributes of the resource to the user attributes; and
increasing a rank of a first search result having an alignment score indicating that the resource attributes of the resource referenced by the first search result are most aligned with the user attributes relative to other resources referenced by the search results.

4. The method of claim 3, further comprising:
decreasing a rank of a second search result that is ranked higher than the first search result in the first order and that has an alignment score indicating that the resource attributes of the resource referenced by the second search result are less aligned with the user attributes relative to the resource referenced by the first search result.

5. The method of claim 3, further comprising:
maintaining the rank of search results including resource locators having a resource name ending in the same domain name and that are not included in the set of similar resource locators.

6. The method of claim 3, wherein:
determining resource attributes of a resource addressed by the resource locator comprises determining language attributes of the resource and geographic attributes of the resource; and
determining address attributes of the resource locator comprises determining language codes and country codes in the resource locator.

7. The method of claim 3, wherein:
determining resource attributes of a resource addressed by the resource locator comprises determining user agent attributes of the resource;
determining address attributes of the resource locator comprises determining a user agent code in the resource locator;
incrementing a user agent counter in response to determining, based on the comparison, that a resource addressed by a resource locator that includes a user agent code includes data specific to a user agent specified by the user agent code in the resource locator; and
determining a likelihood that the address attribute of the resource indicates a user agent based on the user agent counter.

8. The method of claim 3, wherein:
the address attributes include a language attribute, a country attribute, and a user agent attribute;
generating for each search result an alignment score from user attributes and from the likelihoods associated with the resource locator comprises generating for each search result a language alignment score, a country alignment score, and a user agent alignment score; and
increasing a rank of a first search result having an alignment score indicating that the resource attributes of the resource referenced by the first search result are most aligned with the user attributes relative to other resources referenced by the search results comprises increasing the rank of a first search result according to an alignment priority in which the language alignment scores take precedent over the country alignment scores, and the country alignment scores take precedent over the user agent alignment scores.

9. The method of claim 3, further comprising:
identifying the set of similar resource locators to which the resource locator in the first search result belongs; and
including with the first search result a link to list of the other resource locators in the identified set of similar resource locators.

10. The method of claim 6, wherein determining, based on the comparison, a likelihood that the address attribute of the resource locators in the set of similar resource locators indicates a resource attribute of the resources comprises:
incrementing a language counter in response to determining, based on the comparison, that a resource addressed by a resource locator is written in a language indicated by the language code;
incrementing a country counter in response to determining, based on the comparison, that a resource addressed by a resource locator is targeted to users residing in a country identified by the country code; and
determining a likelihood that the address attribute of the resource indicates a language based on the language counter; and
determining a likelihood that the address attribute of the resource indicates a country based on the country counter.

11. A system, comprising:
a data processing apparatus in data communication with resource index data store, the resource index data indexing data of the resources and resource locators addressing the resources, wherein the data processing apparatus includes one or more processors;
a data storage apparatus in data communication with the data processing apparatus and storing instructions executable by the data processing apparatus and upon execution by the data processing apparatus cause the data processing apparatus to perform operations comprising:

selecting resource locators having a resource name ending in a same domain name;

determining for each resource locator:
resource attributes of a resource addressed by the resource locator, wherein the resource attributes are attributes of content the resource, and each resource attribute corresponds to a plurality of characteristic values for the resource attribute; and address attributes of the resource locator, each address attribute being a corresponding portion of the resource locators that varies according to an identified pattern and corresponding to a plurality of address attribute values;

determining a set of similar resource locators from the address attributes of the resource locators, the set of similar resource locators being a set of resource locators having a same address attribute in addition to the same domain name, and wherein the resource locators in the set of resource locators vary according to the address attribute values to which the address attribute corresponds;

comparing at the data processing apparatus the address attribute of the resource locators in the set of similar resource locators to the resource attributes of the resources addressed by the resource locators in the set of similar resource locators;

determining, based on the comparison, a likelihood that the address attribute of the resource locators in the set of similar resource locators indicates a resource attribute of the resources, the indication being based on resources referenced by the resource locators with the address attribute varying by the address attribute values according to the plurality of characteristic values corresponding to the resource attribute; and associating, in the resource index data store, the likelihood of the address attribute with the resource locators in the set of similar resource locators.

12. The system of claim 11, wherein determining a set of similar resource locators from the address attributes of the resource locators comprises determining resource locators having the same address attribute prepending the same domain name.

13. The system of claim 11, wherein the instructions, upon execution by the data processing apparatus, cause the data processing apparatus to perform further operations comprising:

receiving search results responsive to a query, the search results ranked according to a first order, and each search result including a resource locator referencing a resource;

for each search result including a resource locator associated with likelihoods of the address attributes, generating an alignment score from user attributes and from the likelihoods associated with the resource locator, each alignment score being a measure of an alignment of resource attributes of the resource to the user attributes; and increasing a rank of a first search result having an alignment score indicating that the resource attributes of the resource referenced by the first search result are most aligned with the user attributes relative to other resources referenced by the search results.

14. The system of claim 13, wherein the instructions, upon execution by the data processing apparatus, cause the data processing apparatus to perform further operations comprising:

identifying the set of similar resource locators to which the resource locator in the first search result belongs; and including with the first search result a link to list of the other resource locators in the identified set of similar resource locators.

15. The system of claim 13, wherein the instructions, upon execution by the data processing apparatus, cause the data processing apparatus to perform further operations comprising:

decreasing a rank of a second search result that is ranked higher than the first search result in the first order and that has an alignment score indicating that the resource attributes of the resource referenced by the second search result are less aligned with the user attributes relative to the resources referenced by the first search result.

16. The system of claim 13, wherein the instructions, upon execution by the data processing apparatus, cause the data processing apparatus to perform further operations comprising:

maintaining the rank of search results including resource locators having a resource name ending in the same domain name and that are not included in the set of similar resource locators.

17. The system of claim 13, wherein:
determining resource attributes of a resource addressed by the resource locator comprises determining language attributes of the resource and geographic attributes of the resource; and determining address attributes of the resource locator comprises determining language codes and country codes in the resource locator.

18. The system of claim 13, wherein:
determining resource attributes of a resource addressed by the resource locator comprises determining user agent attributes of the resource;

determining address attributes of the resource locator comprises determining a user agent code in the resource locator;

incrementing a user agent counter in response to determining, based on the comparison, that a resource addressed by a resource locator that includes a user agent code includes data specific to a user agent specified by the user agent code in the resource locator; and determining a likelihood that the address attribute of the resource indicates a user agent based on the user agent counter.

19. The system of claim 13, wherein:
the address attributes include a language attribute, a country attribute, and a user agent attribute;

generating for each search result an alignment score from user attributes and from the likelihoods associated with the resource locator comprises generating for each search result a language alignment score, a country alignment score, and a user agent alignment score; and increasing a rank of a first search result having an alignment score indicating that the resource attributes of the resource referenced by the first search result are most aligned with the user attributes relative to other resources referenced by the search results comprises increasing the rank of a first search result according to an alignment priority in which the language alignment scores take precedent over country alignment scores, and country alignment scores take precedent over user agent alignment scores.

20. The system of claim 17, wherein determining, based on the comparison, a likelihood that the address attribute of the resource locators in the set of similar resource locators indicates a resource attribute of the resources comprises:
   incrementing a language counter in response to determining, based on the comparison, that a resource addressed by a resource locator is written in a language indicated by the language code;
   incrementing a country counter in response to determining, based on the comparison, that a resource addressed by a resource locator is targeted to users residing in a country identified by the country code; and
   determining a likelihood that the address attribute of the resource indicates a language based on the language counter; and
   determining a likelihood that the address attribute of the resource indicates a country based on the country counter.

21. A method performed by a data processing apparatus, the method comprising:
   selecting at a data processing apparatus that includes one or more processors, resource locators having a resource name ending in a same domain name;
   determining in the data processing apparatus, for each resource locator:
      resource attributes of a resource addressed by the resource locator, wherein the resource attributes are attributes of content of the resource, and each resource attribute corresponds to a plurality of characteristic values for the resource attribute; and
      address attributes of the resource locator, each address attribute being a corresponding portion of the resource locators that varies according to an identified pattern and corresponding to a plurality of address attribute values;
   determining at the data process apparatus a set of similar resource locators from the address attributes of the resource locators, each of the sets of similar resource locators being a set of resource locators having one of the address attributes in addition to the same domain name, and wherein the resource locators in the set of resource locators vary according to the address attribute values to which the address attribute corresponds;
   determining at the data processing apparatus a likelihood that the address attribute of the resource locators in the set of similar resource locators indicates a resource attribute of the resources, the indication being based on resources referenced by the resource locators with the address attribute varying by the address attribute value according to the plurality of characteristic values corresponding to the resource attribute; and
   associating, in a resource index data store, a likelihood of the address attribute with the resource locators in the set of similar resource locators.

22. The method of claim 21, comprising:
   receiving search results responsive to a query, the search results ranked according to a first order, and each search result including a resource locator referencing a resource;
   for each search result including a resource locator associated with a likelihood of the address attribute, generating at the data processing apparatus an alignment score from user attributes and from the likelihood associated with the resource locator, each alignment score being a measure of an alignment of resource attributes of the resource to the user attributes; and
   increasing a rank of a first search result having an alignment score indicating that the resource attributes of the resource referenced by the first search result are most aligned with the user attributes relative to other resources referenced by the search results.

23. The method of claim 21, wherein:
   determining resource attributes of a resource addressed by the resource locator comprises determining language attributes of the resource;
   determining address attributes of the resource locator comprises determining language codes in the resource locator;
   and further comprising:
      comparing at the data processing apparatus the language code of the resource locators in the set of similar resource locators to the languages of the resources addressed by the resource locators in the set of similar resource locators;
      incrementing a language counter in response to determining, based on the comparison, that a resource addressed by a resource locator is written in a language indicated by the language code; and
      determining a likelihood that the address attribute of the resource indicates a language based on the language counter.

24. A non-transitory computer storage medium encoded with a computer program, the program comprising instructions that when executed by data processing apparatus cause the data processing apparatus to perform operations comprising:
   selecting resource locators having a resource name ending in a same domain name;
   determining for each resource locator:
      resource attributes of a resource addressed by the resource locator, wherein the resource attributes are attributes of content of the resource, and each resource attribute corresponds to a plurality of characteristic values for the resource attribute; and
      address attributes of the resource locator, each address attribute being a corresponding portion of the resource locators that varies according to an identified pattern and corresponding to a plurality of address attribute values;
   determining a set of similar resource locators from the address attributes of the resource locators, the set of similar resource locators being a set of resource locators having a same address attribute prepending the same domain name, and wherein the resource locators in the set of resource locators vary according to the address attribute values to which the address attribute corresponds;
   comparing at the data processing apparatus the address attribute of the resource locators in the set of similar resource locators to the resource attributes of the resources addressed by the resource locators in the set of similar resource locators;
   determining, based on the comparison, a likelihood that the address attribute of the resource locators in the set of similar resource locators indicates a resource attribute of the resources, the indication being based on resources referenced by the resource locators with the address attribute varying by the address attribute value according to the plurality of characteristic values corresponding to the resource attribute; and associating, in a resource index data store, the likelihood of the address attribute with the resource locators in the set of similar resource locators.

25. A system comprising:
a user device; and
a data processing apparatus operable to interact with the device and to perform operations comprising:
selecting at the data processing apparatus resource locators having a resource name ending in a same domain name;
determining at the data processing apparatus, for each resource locator:
  resource attributes of a resource addressed by the resource locator, wherein the resource attributes are attributes of content of the resource, and each resource attribute corresponds to a plurality of characteristic values for the resource attribute; and
  address attributes of the resource locator, each address attribute being a corresponding portion of the resource locators that varies according to an identified pattern and corresponding to a plurality of address attribute values;
determining at the data process apparatus a set of similar resource locators from the address attributes of the resource locators, the set of similar resource locators being a set of resource locators having a same address attribute in addition to the same domain name, and wherein the resource locators in the set of resource locators vary according to the address attribute values to which the address attribute corresponds;
comparing at the data processing apparatus the address attribute of the resource locators in the set of similar resource locators to the resource attributes of the resources addressed by the resource locators in the set of similar resource locators;
determining, based on the comparison, a likelihood that the address attribute of the resource locators in the set of similar resource locators indicates a resource attribute of the resources, the indication being based on resources referenced by the resource locators with the address attribute varying by the address attribute values according to the plurality of characteristic values corresponding to the resource attribute;
associating, in a resource index data store, the likelihood of the address attributes with the resource locators in the set of similar resource locators;
receiving search results responsive to a query, the query provided from the user device, the search results ranked according to a first order, and each search result including a resource locator referencing a resource;
for each search result including a resource locator associated with likelihoods of the address attributes, generating an alignment score from user attributes and from the likelihoods associated with the resource locator, each alignment score being a measure of an alignment of resource attributes of the resource to the user attributes; and
increasing a rank of a first search result having an alignment score indicating that the resource attributes of the resource referenced by the first search result are most aligned with the user attributes relative to other resources referenced by the search results; and
provide the search results with the first search result increased in the first order to the user device.

26. The system of claim 25, wherein the data processing apparatus comprises a server operable to interact with the user device through a data communication network, and the user device is operable to interact with the server as a client.

27. The system of claim 26, wherein the user device comprises a personal computer running a web browser.

* * * * *